United States Patent Office 3,646,088
Patented Feb. 29, 1972

3,646,088
PREPARATION OF SILOXANES BY REDISTRIBUTION
Georges Bakassian, Caluire, and Andre Bazquin, Luzinay, France, assignors to Rhone-Poulenc S.A., Paris, France
No Drawing. Filed Nov. 27, 1970, Ser. No. 93,505
Claims priority, application France, Nov. 27, 1969, 6940954
Int. Cl. C07f 7/08, 7/18
U.S. Cl. 260—448.2 P
8 Claims

ABSTRACT OF THE DISCLOSURE

A redistribution reaction between a siloxane and a chlorosilane, involving cleavage of a silicon oxygen bond, introduction of chlorine into one fragment of the siloxane and introduction of the residue of the chlorosilane into the other fragment of the siloxane, is carried out in a hexaalkylphosphotriamide.

---

The present invention relates to a process for obtaining siloxane compounds by a redistribution reaction between a siloxane compound and a chlorosilane.

Redistribution reactions between a siloxane and a chlorosilane are already known. Thus U.S. patent specifications Nos. 3,065,252 and 3,101,361 describe catalytic systems of one or two constituents which allow siloxanes to be prepared whilst avoiding the rearrangement reactions of the siloxane bonds and the cleavage reactions of the bonds which join a silicon atom to an organic radical. The catalysts essentially consists of aliphatic or aromatic amines, quaternary ammonium hydroxides, as well as carboxylic acid salts of amines or of quaternary ammonium hydroxides, it being essential to combine certain of these various compounds with a solvent of high dielectric constant.

The present invention provides a process for the preparation of a siloxane product by reaction between a siloxane reactant with a chlorosilane, to bring about a redistribution reaction wherein the reaction is carried out in the presence of a hexaalkylphosphotriamide.

The use of a hexaalkylphosphotriamide makes is possible to achieve high speeds of reaction and generally to have a complete redistribution reaction; furthermore, the hexaalkylphophotriamide avoids side-reactions.

The redistribution reaction between the starting siloxane and the chlorosilane can be defined as the breakage of a silicon-oxygen bond and the rearrangement of the two free valencies thus produced, one of these being saturated by a chlorine atom belonging to the chlorosilane and the other being saturated by the remainder of the organochlorosilane molecule.

It is therefore possible, starting from a siloxane compound, to obtain a mixture containing two new siloxanes and two new chlorosilanes. However, for example, in the case of a redistribution using a siloxane where the silicon atom is substituted by identical triorganosiloxy groups, a single siloxane and a single chlorosilane are obtained. A similar case is found on starting from symmetrical siloxanes. The siloxane compounds which only yield a single new siloxane are obviously reagents which it is particularly valuable to choose within the framework of the invention, because the separation of the reaction products is simpler.

Hexaalkylphosphotriamides which are suitable for use in the invention include those of general formula:

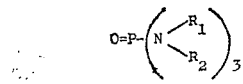

in which the radicals $R_1$ and $R_2$, which may be identical or different, represent straight or branched chain alkyl radicals having 1 to 6 carbon atoms, for example hexamethylphosphotriamide.

The siloxane compounds which can be used in the invention include those of general formula:

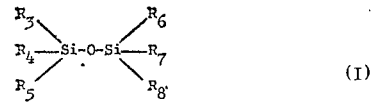
(I)

in which the radicals $R_3$, $R_4$, $R_5$, $R_6$ $R_7$ and $R_8$, which may be identical or different, each represent a monovalent, aliphatic or cycloaliphatic, organic hydrocarbon group which may be saturated or have one or more sites of ethylenic unsaturation, or an aryl or aralkyl group, or a silyloxy group in which the silicon atom is attached to monovalent aliphatic, cycloaliphatic, aromatic or aralkyl hydrocarbon groups.

The invention is concerned more particularly with compounds of Formula I in which the identical or different R radicals represent straight or branched alkyl or alkenyl groups having at most 6 carbon atoms, cycloalkyl or cycloalkenyl groups having 5 or 6 ring carbon atoms, phenyl, alkylphenyl or phenylalkyl groups, or trialkylsilyloxy groups of which the alkyl groups have at most 6 carobn atoms.

Specific compounds of Formula I which may be used include:

hexamethyldisiloxane,
hexapropyldisiloxane,
1,1,1,-tripropyl-3,3,3-trimethyl-disiloxane,
1,1,3,3-tetraphenyl-1,3-dimethyl-disiloxane,
1,1,3,3-tetramethyl-1,3-diphenyl-disiloxane,
1,1,3-trivinyl-1,3,3-trimethyl-disiloxane,
1,3-dicyclohexyl-1,3-dimethyl-1,3-divinyldisiloxane, and
1,1,1-trimethyl-3,3-bis(trimethylsilyloxy)-3- phenyldisiloxane.

Chlorosilanes which may be reacted with the disiloxane of Formula I include those of general formula:

$$(R_9)_{(4-n)}SiCl_n \qquad (II)$$

in which $n$ is 1 or 2 and the $R_9$ groups, which may be the same or different, represent a monovalent, saturated or unsaturated hydrocarbon radical of aliphatic, cycloaliphatic, aromatic or aralkyl character. $R_9$ may optionally contain various inert substituents such as the halogen atoms.

The preferred chlorosilanes are those in which the groups $R_9$, which may be identical or different, represent straight or branched alkyl or alkenyl groups having at most 6 carbon atoms, or cycloalkyl or cycloalkenyl groups having 5 or 6 ring carbon atoms, or chlorosubstituted derivatives thereof. Specific silanes which may be used include: trimethylchlorosilane, vinyldimethylchlorosilane, diphenylmethylchlorosilane, dimethyldichlorosilane, divinyldichlorosilane, methylphenyldichlorosilane, diphenyldichlorosilane and chloromethyldimethylchlorosilane.

The amount of hexaalkylphosphotriamide employed can vary within wide limits. This amount, expressed by weight, is usually from 0.1 to 10 and preferably from 0.5 to 5% of the total weight of the reagents.

The reagents can be used in very diverse molar proportions. In general, a sub-stoichiometric amount of chlorosilane is employed, which allows this compound to be converted completely.

The redistribution reaction can be carried out at a temperature between 0 and 250° C. and preferably between 20 and 200° C.

3

After having mixed the reagents and the hexaalkylphosphotriamide, the reaction mixture is brought to the desired temperature e.g. by heating and the reaction products are then isolated by any known method. Fractional distillation is particularly valuable for this purpose.

The redistribution process according to the invention makes it possible to obtain siloxanes having a triorganosilyl radical attached to a triorganosilyloxy radical of formula —$OSi(Cl)_{n-1}(R_9)_{4-n}$. These can for example be used as cross-linking agents for organosilicon resins and rubbers. Furthermore, the process also makes it possible conveniently to obtain various monochlorosilanes which are extensively used in organosilicon chemistry as polysiloxane chain stopping agents.

The examples which follow illustrate the invention.

EXAMPLE 1

1620 g. of hexamethyldisiloxane, 1265, g. of diphenyldichlorosilane and 107 g. of hexamethylphosphotriamide are introduced into a 5 litres volume flask and the reaction mixture is heated to 90° C. for 4 hours. A distillation under reduced pressure is then carried out and the fractions $F_1$ (boiling point $_{760\ mm.}$=57–58° C.) containing 540 grams of trimethylchlorosilane and $F_2$ (boiling point $_{760\ mm.}$=98–100° C.) containing 810 g. of hexamethyldisiloxane are recovered. The residue from the preceding distillation is in its turn fractionated under reduced pressure. Fraction $F_3$ (boiling point $_{0.25}$=86–110° C.), weight 155 g. and containing a mixture of 1,1,1-trimethyl-3,3-diphenyl-3-chloro-disiloxane and hexamethylphosphotriamide (in the proportion of 30 and 70%), and fraction $F_4$ (boiling point $_{0.25}$=128–130° C.), weighing 1340 g. and containing pure 1,1,1-trimethyl-3,3-diphenyl-3-chloro-disiloxane are obtained. The yield of pure chlorodisiloxane is thus 88% relative to the hexamethyldisiloxane.

EXAMPLE 2

The procedure of Example 1 is followed using a reaction mixture consisting of 162 g. of hexamethyldisiloxane, 955 g. of methylphenyldichlorosilane and 1 g. of hexamethylphosphotriamide which is heated at 115° C. for 17 hours. After distillation, a 90 g. fraction is obtained, boiling point $_{0.3\ mm.}$=63–64° C., corresponding to 1,1,1,3-tetramethyl-3-phenyl-3-chloro-disiloxane (purity 92.5%).

EXAMPLE 3

The procedure of Example 1 is followed using a reaction mixture consisting of 406 g. of hexamethyldisiloxane, 282 g. of methylvinyldichlorosilane and 7 g. of hexamethylphosphotriamide which is heated at 140° C. for 4 hours. After distillation, a 143 g. fraction is obtained, boiling point $_{752}$=135–137° C., corresponding to 1,1,1,3-tetramethly-3-vinyl-3-chlorodisiloxane (purity 95.5%).

EXAMPLE 4

A reaction mixture consisting of 400 g. of 1,1,3,3-tetramethyl-1,3-diphenyl-disiloxane, 218 g. of methylphenyldichlorosilane and 30 g. of hexamethylphosphotriamide is heated at 200° C. for 10 hours. After distillation, a 400 g. fraction is obtained, boiling point $_{0.4\ mm}$=106–113° C., corresponding to 1,1,3-trimethyl-1,3-diphenyl-3-chloro-disiloxane (purity 45%, the remainder consisting of 1,1,3,3-tetramethyl-1,3-diphenyldisiloxane).

EXAMPLE 5

A reaction mixture consisting of 224 g. of pentamethylphenyl-disiloxane, 260 g. of dimethyldichlorosilane and 4 g. of hexamethylphosphotriamide is heated at 100° C. for 5 hours. After distillation, a 50 g. fraction is obtained, boiling point $_{0.25\ mm.}$=41–50° C., corresponding to 1,1,3,3-tetramethyl-1-phenyl-3-chloro-siloxane (purity 60%, the remainder consisting of dimethylphenylchlorosilane).

EXAMPLE 6

A reaction mixture consisting of 744 g. of tris(trimethylsiloxy)phenylsilane, 191 g. of methylphenyldichlorosilane and 8.5 g. of hexamethylphosphotriamide is heated to 140° C. for 4 hours. On distillation, a 285 g. fraction is obtained, boiling point $_{0.4\ mm.}$=122–125° C., corresponding to 1,3-diphenyl-3-methyl-3-chloro-1,1-bis(trimethylsiloxy)siloxane of 99% purity.

EXAMPLE 7

A reaction mixture consisting of 1860 g. of tris(trimethylsiloxy)phenyl silane, 506 g. of diphenylchlorosilane and 30 g. of hexamethylphosphotriamide is heated at 160° C. for 4 hours. On distillation, a 449 fraction is obtained, boiling point $_{0.4\ mm.}$=164–166° C., corresponding to 1,3,3-triphenyl-3-chloro-1,1-bis(trimethylsiloxy)siloxane of 98% purity.

EXAMPLE 8

A reaction mixture consisting of 2447 g. of hexamethyldisiloxane, 1550 g. of dimethyldichlorosilane and 20 g. of hexamethylphosphotriamide is heated in an autoclave at 140° C. for 1 hour 40 minutes. On distillation, a 970 g. fraction, boiling point $_{760}$=117–119° C., of pentamethylchlorodisiloxane of 97.5% purity is obtained.

EXAMPLE 9

A reaction mixture consisting of 405 g. of hexamethyldisiloxane, 286 g. of dimethylchloromethylchlorosilane and 7 g. of hexamethylphosphotriamide is heated at 170° C. for 1 hours 20 minutes in an autoclave. On distillation, a fraction of 161 g. of boiling point $_{26}$=57.6° C., containing pentamethylchloromethyldisiloxane of 95% purity, is obtained.

We claim:

1. Process for the preparation of a siloxane product by reaction between a siloxane reactant with a chlorosilane, to bring about a redistribution reaction wherein the reaction is carried out in the presence of a hexaalkylphosphotriamide.

2. Process according to claim 1 wherein the hexaalkylphosphotriamide is of formula:

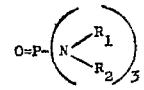

where $R_1$ and $R_2$, which may be the same or different, each represent a straight or branched chain alkyl radical of 1 to 6 carbon atoms.

3. Process according to claim 2 wherein the hexaalkylphosphotriamide is hexamethylphosphotriamide.

4. Process according to claim 1 wherein the siloxane reactant is a siloxane of formula:

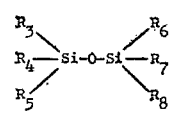

where $R_3$, $R_4$, $R_5$, $R_6$, $R_7$ and $R_8$, which may be the same or different, each represent an alkyl or alkenyl group containing up to 6 carbon atoms, a cycloalkyl or cycloalkenyl group containing 5 or 6 ring carbon atoms, or a phenyl, alkylphenyl, phenylalkyl or trialkylsiloxy group where the alkyl residue has up to 6 carbon atoms.

5. Process according to claim 1 wherein the chlorosilane is of the formula:

$$(R_9)_{(4-n)}SiCl_n$$

where $n$ is 1 or 2 and the $R_9$ groups, which may be the same or different, each represent an alkyl or alkenyl group containing up to 6 carbon atoms or a cycloalkyl or cycloalkenyl group containing 5 or 6 ring carbon atoms or chloro-substituted derivatives thereof.

6. Process according to claim 1 where the hexaalkylphosphotriamide comprises 0.5 to 5% of the total weight of the reactants.

7. Process according to claim 1 wherein the reactants are heated at 20 to 200° C.

8. Process according to claim 1 wherein at least one siloxane selected from the group consisting of hexamethyldisiloxane, hexapropyldisiloxane, 1,1,1-tripropyl-3,3,3-trimethyl - disiloxane, 1,1,3,3-tetraphenyl-1,3-dimethyl-disiloxane, 1,1,3,3-tetramethyl-1,3-diphenyl-disiloxane, 1,1,3-trivinyl-1,3,3-trimethyl-disiloxane, 1,3 - dicyclohexyl - 1,3-dimethyl-1,3-divinyl-disiloxane, and 1,1,1-trimethyl-3,3-bis(trimethylsilyloxy)-3-phenyl-disiloxane is heated at 20 to 200° C. with a silane selected from the group consisting of trimethylchlorosilane, vinyldimethylchlorosilane, diphenylmethylchlorosilane, dimethyldichlorosilane, divinyldichlorosilane, methylphenyldichlorosilane, diphenyldichlorosilane and chloromethyldimethylchlorosilane in the presence of 0.5 to 5% hexamethylphosphotriamide based on the total weight of the reactants.

References Cited

UNITED STATES PATENTS

| | | | |
|---|---|---|---|
| 2,421,653 | 6/1947 | Sauer | 260—448.2 P X |
| 3,065,252 | 11/1962 | Brown et al. | 260—448.2 P |
| 3,101,361 | 8/1963 | Brown et al. | 260—448.2 P |
| 3,177,178 | 4/1965 | Bluestein | 260—448.2 P. X. |
| 3,322,722 | 5/1967 | Eynon | 260—448.2 P X |

JAMES E. POER, Primary Examiner

P. F. SHAVER, Assistant Examiner

U.S. Cl. X.R.

260—448.8 R

PO-1050
(5/69)

UNITED STATES PATENT OFFICE
CERTIFICATE OF CORRECTION

Patent No. 3,646,088          Dated February 29, 1972

Inventor(s) GEORGES BAKASSIAN et al

It is certified that error appears in the above-identified patent and that said Letters Patent are hereby corrected as shown below:

In the heading, for the surname of the second-named inventor, for "Bazquin" read -- Bazouin --.

Signed and sealed this 17th day of October 1972.

(SEAL)
Attest:

EDWARD M. FLETCHER, JR.          ROBERT GOTTSCHALK
Attesting Officer          Commissioner of Patents